US012442152B2

(12) United States Patent
Ito

(10) Patent No.: US 12,442,152 B2
(45) Date of Patent: Oct. 14, 2025

(54) SOUND AMPLIFICATION STRUCTURE AND BUILDING FOUNDATION STRUCTURE

(71) Applicant: Shimex, Ltd., Tokyo (JP)

(72) Inventor: Atsushi Ito, Tokyo (JP)

(73) Assignee: Shimex Ltd., Tokyo (JP)

( * ) Notice: Subject to any disclaimer, the term of this patent is extended or adjusted under 35 U.S.C. 154(b) by 354 days.

(21) Appl. No.: 18/155,348

(22) Filed: Jan. 17, 2023

(65) Prior Publication Data

US 2023/0235525 A1 Jul. 27, 2023

Related U.S. Application Data

(60) Provisional application No. 63/267,116, filed on Jan. 25, 2022.

(51) Int. Cl.
*E02D 27/32* (2006.01)
*G10K 11/26* (2006.01)
*H04R 1/26* (2006.01)

(52) U.S. Cl.
CPC .............. *E02D 27/32* (2013.01); *G10K 11/26* (2013.01); *H04R 1/26* (2013.01)

(58) Field of Classification Search
CPC ........ E02D 27/32; G10K 11/26; G10K 11/08; G10K 11/28; H04R 1/26; H04R 1/026;
(Continued)

(56) References Cited

U.S. PATENT DOCUMENTS 1,846,534 A * 2/1932 Volf, Jr. ................ E04B 1/8218 181/30
4,330,691 A * 5/1982 Gordon .................... H04R 1/02 381/186

(Continued)

FOREIGN PATENT DOCUMENTS

EP 3685594 A1 7/2020
JP H06341174 A 12/1994

(Continued)

OTHER PUBLICATIONS

Underfloor concrete backload horn machine translated (Year: 2020).*

(Continued)

*Primary Examiner* — Forrest M Phillips
*Assistant Examiner* — Joseph James Peter Illicete
(74) *Attorney, Agent, or Firm* — Simpson & Simpson, PLLC; S. Peter Konzel

(57) ABSTRACT

A sound amplification structure includes a sound path that is formed by an underfloor foundation of a building and a concrete peripheral wall formed by standing up approximately vertically from the underfloor foundation. One end of the sound path (a speaker unit communication section) is able to communicate with a floor speaker unit placed in a room of the building. A width of the sound path widens from the one end toward other end of the sound path. The other end of the sound path (an output unit) is able to output sounds that are emitted from the floor speaker unit and amplified through the sound path. A length of the sound path is 4 m or longer. Preferably, the sound path is U-shaped, Z-shaped, or a zig-zag shaped. The concrete peripheral wall preferably doubles as a building foundation structure.

3 Claims, 5 Drawing Sheets

(58) Field of Classification Search
CPC .......... H04R 1/2865; H04R 1/30; E04B 1/99; E04B 2001/8414; E04B 2001/8281; E04B 1/86
USPC ............................ 181/30, 152, 177; 381/337
See application file for complete search history.

(56) References Cited

U.S. PATENT DOCUMENTS

| | | | | |
|---|---|---|---|---|
| 4,778,027 | A * | 10/1988 | Taylor | H04R 1/02 181/150 |
| 5,525,765 | A * | 6/1996 | Freiheit | E04B 1/99 181/30 |
| 6,530,451 | B2 * | 3/2003 | Noselli | G10K 11/28 181/177 |
| 10,659,856 | B1 * | 5/2020 | Pierce | H04R 1/026 |
| 2001/0023792 | A1 | 9/2001 | Noselli | |
| 2007/0080019 | A1 * | 4/2007 | Kubota | G10K 11/025 181/185 |
| 2015/0172799 | A1 * | 6/2015 | O'Neal | H04R 1/2811 381/77 |
| 2020/0204909 | A1 | 6/2020 | Stanley et al. | |

FOREIGN PATENT DOCUMENTS

| | | |
|---|---|---|
| JP | 2007016421 A | 1/2007 |
| JP | 2020038329 A | 3/2020 |

OTHER PUBLICATIONS

Underfloor concrete backload horn original untranslated (Year: 2020).*

Speaker Factory, an under-floor concrete back load horn, Feb. 12, 2021; https://web.archive.org/web/20210212150414/https: //www.xperience.jp/news/20201110/.

* cited by examiner

SOUND AMPLIFICATION STRUCTURE AND BUILDING FOUNDATION STRUCTURE

CROSS REFERENCE TO RELATED APPLICATIONS

This application claims priority to U.S. provisional patent application No. 63/267,116, filed Jan. 25, 2022, which application is incorporated herein by reference in its entirety.

TECHNICAL FIELD

The present invention relates to a sound amplification structure and a building foundation structure.

BACKGROUND ART

Heretofore, there has been a demand for realization of a sound field with a sense of reality. To provide a high-quality acoustic space, however, it is necessary to increase a size of a speaker to be placed on a floor. Installation of the acoustic space in a residential house imposes restrictions on both a space and withstand load of the floor.

For example, there has been a proposal to provide a space part for installing a subwoofer in an underfloor space part of a first floor of a building and to enclose the space part with a mass body for noise insulation (See PLT 1). The invention according to the PLT 1 has effects that the subwoofer does not become an obstacle in a room and that yet deep bass of the subwoofer is not easily transmitted to an adjacent room or an upper floor.

CITATION LIST

Patent Literature

[PTL 1] Japanese Unexamined Patent Application Publication No. 2007-016421

SUMMARY OF THE INVENTION

Problems to be Solved by the Invention

However, the invention of the PTL1 is to devise a place to install a subwoofer and not to devise a place to install a speaker. Therefore, it is not possible to state that the invention according to the PTL1 is able to solve any problem caused by an increase in size of the speaker.

The present invention has been made to solve the above-mentioned problems of the prior-art, and an object of the present invention is to realize a sound field with a sense of reality in a residential house without increasing a size of a speaker to be placed on a floor.

Means for Solving the Problems

As a result of earnest studies of the above problems, the inventor et. al have found that it is possible to solve the above problems by providing a configuration, which corresponds to a tubular structure that amplifies a sound from a back-loaded horn speaker, in an underfloor foundation or the like on a first floor of a building and not behind a speaker unit, and completed the present invention. The back-loaded horn speaker is a system for amplifying a low-pitched sound generated from the back of the speaker unit by means of the tubular structure. Specifically, the present invention provides the following.

The present invention according to a first characteristic provides a sound amplification structure, wherein:

a sound path is formed by an underfloor foundation of a building and a concrete peripheral wall formed by standing up approximately vertically from the underfloor foundation, one end of the sound path is able to communicate with a speaker unit to be placed in a room of the building, a width of the sound path widens from the one end to other end of the sound path, the other end of the sound path is able to output a sound that is emitted from the speaker unit and amplified through the sound path, and a length of the sound path is 4 m or longer.

Known speaker types include a sealed type, a bass-reflex type, a front-loaded type, and a back-loaded horn type. It is known that the back-loaded horn type is able to generate a sound at higher efficiency than the sealed-type, the bass-reflex type, and the front-loaded type. As such, the back-loaded horn type is able to reproduce a realistic sound field with a sharp rise in the entire effective range as well as in a low tone range. Thus, the back-loaded horn type is better from the viewpoint of reproduction of the sound field with a sense of reality. However, the back-loaded horn type has a problem that a tubular structure for amplifying sounds, which has a total length of a few meters, has to be provided behind a speaker unit, thus making an enclosure (also referred to as a “housing” or a “cabinet”) huge. Therefore, at present, the back-loaded horn speakers are not mass-produced in Japan.

With the present invention according to the first characteristic, because the sound path corresponding to the tubular structure is provided in the underfloor foundation of the building, it is not necessary to provide a heavyweight tubular structure in the enclosure of the speaker placed on the floor in the room of the building. Consequently, it becomes possible to place on the floor the back-loaded horn type, although it is a large-size speaker system using the heavyweight sound path with a length of 4 m or longer, by making the size of the enclosure for accommodating the speaker unit comparable with that of the sealed type, the bass-reflex type, and the front-loaded type.

In addition, in general, an enclosure is made of wood, irrespective of the type. Wood is vulnerable to vibrations in the low tone range, however, and causes sound distortion in the low tone range of 20 Hz to 600 Hz. As a consequence, there is a limitation on reproduction of an atmosphere of live performance. It is difficult to output low-pitched sound waves below 30 Hz, in particular, and offer an experience in which one sufficiently feels the atmosphere of live music, including not only human sensitivity and hearing but also tremors caused by sound waves to the whole body.

With the present invention according to the first characteristic, the sound path is surrounded by the concrete peripheral walls and the length of the sound path is 4 m or longer. Concrete has tough physical properties and has no distortion due to the low-pitched sound waves. In addition, it is preferable that the sound path be longer to improve accuracy of bass reproduction. However, if the enclosure is made of wood and the length of the sound path exceeds 3 m, a low-pitched sound reaches the ear more slowly than mid- and high-pitched sounds, which becomes stressful for the listener. In the present invention according to the first characteristic, because the sound path is surrounded by the concrete peripheral walls, there is no delay in arrival of the low-pitched sound even when the length of the sound path is 4 m or longer, and thus the listener is able to listen to the sound without stress.

Accordingly, the present invention according to the first characteristic makes it possible to realize the sound field with a sense of reality in the residential house without increasing the size of the speaker to be placed on the floor.

The present invention according to a second characteristic is the invention according to the first characteristic and provides a sound amplification structure in which the sound path is U-shaped, Z-shaped, or a zig-zag shaped.

With the present invention according to the second characteristic, it is possible to place a sound path in a limited space of an underfloor foundation, and to attenuate mid- and high-pitched sounds, thereby keeping small a level difference between the mid- and high-pitched sounds and the low-pitched sound.

Accordingly, the present invention according to the second characteristic makes it possible to realize a more realistic sound field in the residential house without increasing the size of the speaker to be placed on the floor.

The present invention according to a third characteristic is the invention according to the first or second characteristic and provides a sound amplification structure in which the concrete peripheral walls double as the foundation structure of the building.

With the present invention according to the third characteristic, because a foundation structure of a building exemplified in a cloth foundation or a mat foundation is diverted, it is possible to construct and easily install a sound amplification structure built into a building foundation when the building is newly constructed or remodeled.

The present invention according to a fourth characteristic provides a building foundation structure comprising:

a sound amplification structure according to any of the first to third characteristics; and an underfloor subwoofer installation part that is provided being surrounded by an underfloor foundation and a secondary concrete peripheral wall formed by standing up approximately vertically from the underfloor foundation, and where installation of a subwoofer is possible.

With the present invention according to the fourth characteristic, because an area where the subwoofer is installed is surrounded by the secondary concrete peripheral wall, it is possible to clearly reproduce a slow and thick sound in the low tone range.

For example, in the case of a compact disk (CD) that records rock music, the compact disc itself does not record slow and heavy low-pitched sounds, which may be enjoyed in a live concert. In such a case, use of the subwoofer has the effect of producing the slow and heavy low-pitched sound, and makes it possible to recreate the realism of a concert at home, depending on a genre.

Effect of the Invention

According to the present invention, it is possible to realize a sound field with a sense of reality in a residential house, without increasing a size of a speaker placed on a floor.

MODES FOR CARRYING OUT THE INVENTION

In the following, a description is given in detail of an example of an embodiment of the present invention with reference to the drawings.

<<Speaker System S>

Figure 1:
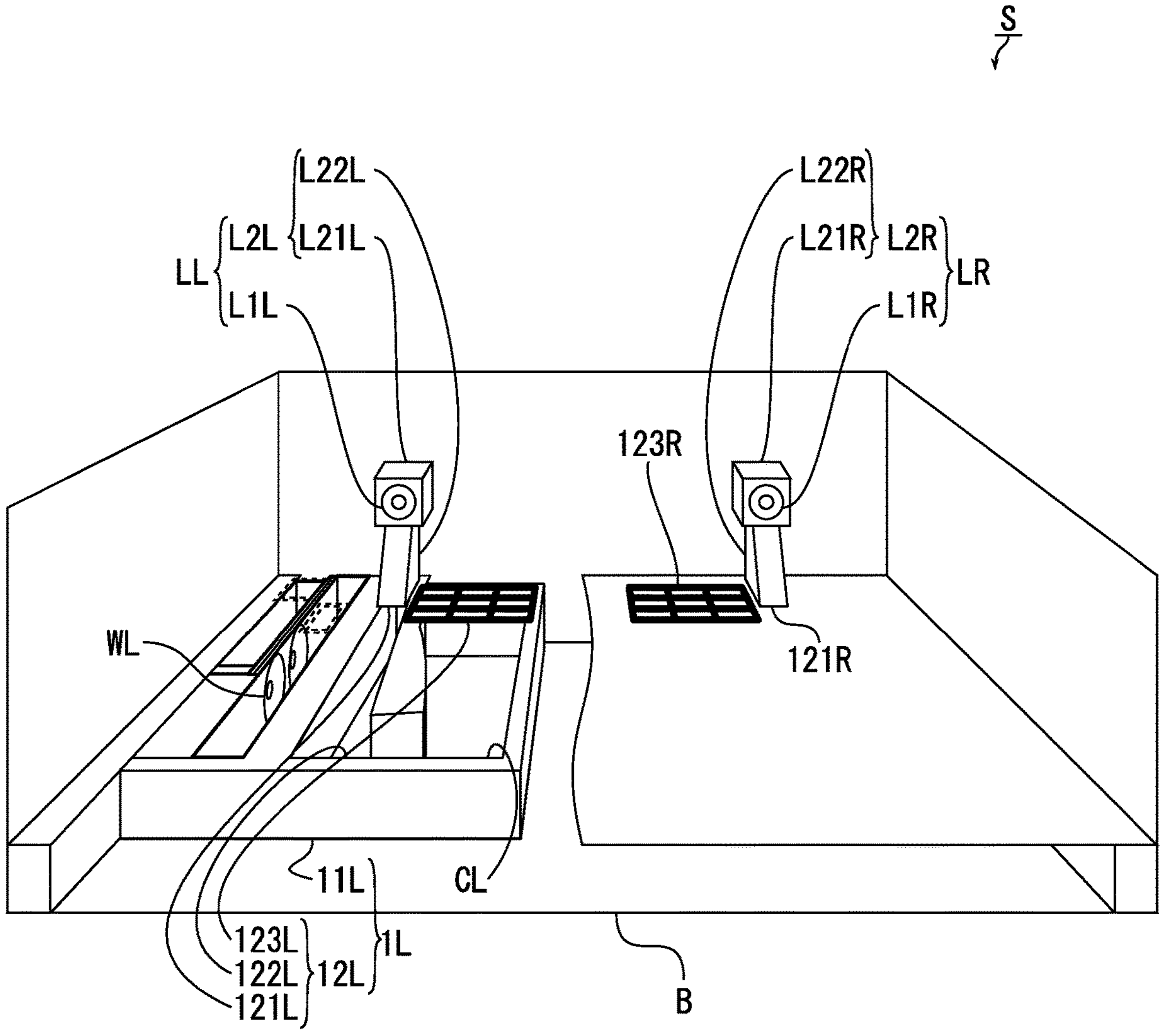
FIG. 1 is a partial perspective view illustrating an outline of a speaker system S of the present embodiment when viewed from diagonally above.
Figure 2:
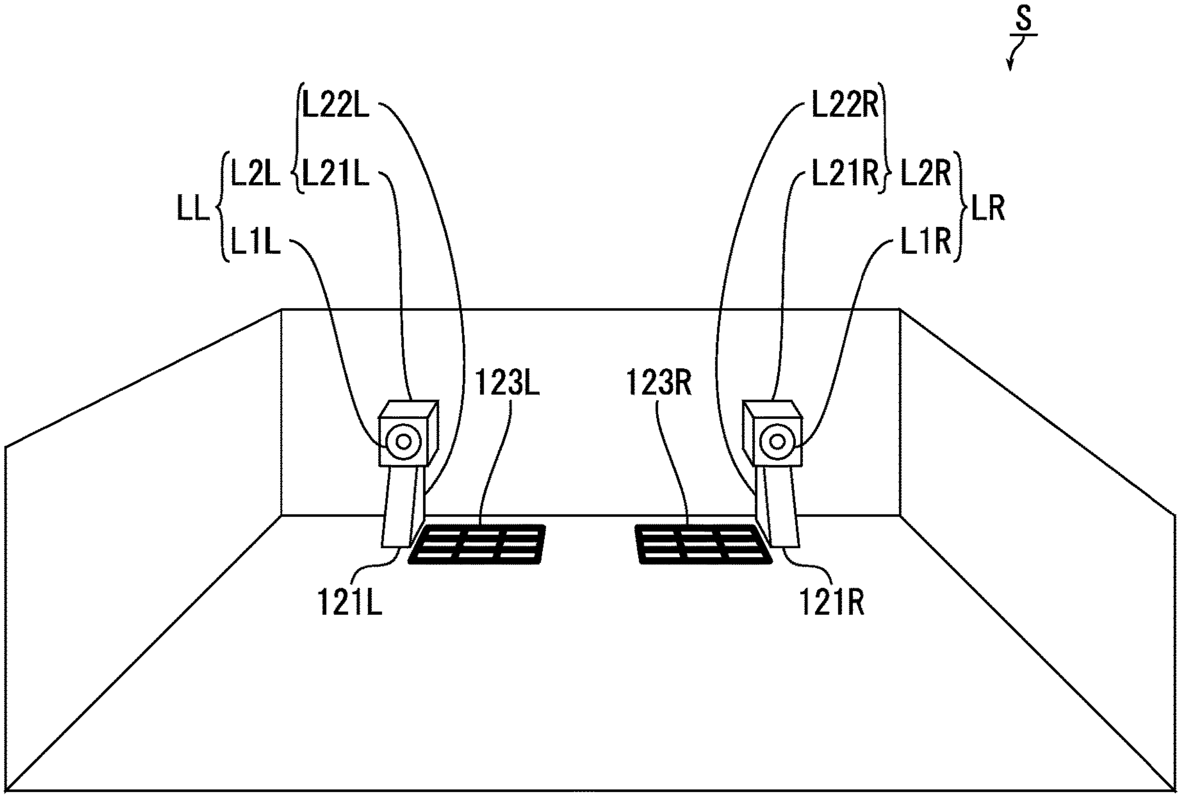
FIG. 2 is a schematic view of the speaker system S of the present embodiment when viewed from diagonally above.
Figure 3:
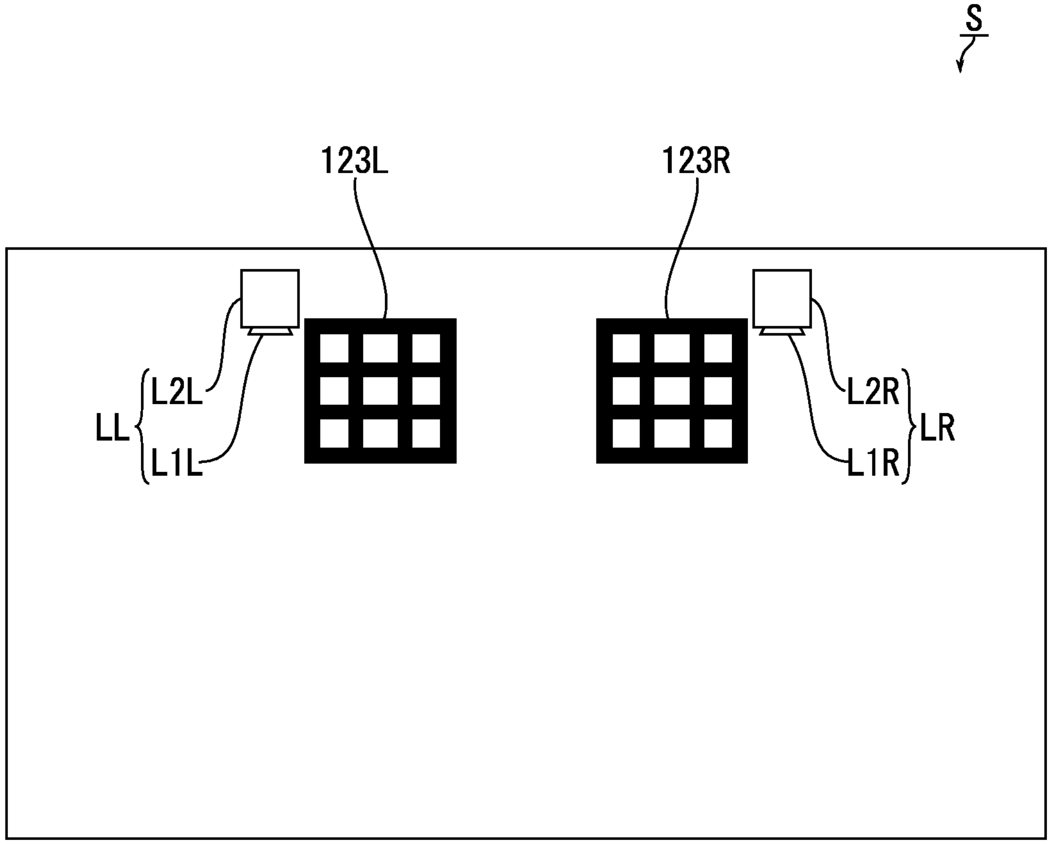
FIG. 3 is a top view illustrating the outline of the speaker system S of the present embodiment.

FIG. 1 is a partial perspective view illustrating an outline of a speaker system S of the present embodiment when viewed from diagonally above. FIG. 2 is a schematic view of the speaker system S of the present embodiment when viewed from diagonally above. FIG. 3 is a top view illustrating the outline of the speaker system S of the present embodiment. The speaker system S includes, at least, one or more floor speakers L, an underfloor foundation B, and one or more building foundation structures U. Note that the building foundation structures U are described below with reference to FIG. 4 and FIG. 5.

<<Floor Speaker L>>

The floor speakers L are those placed on a floor located above the building foundation structure U. It is preferable that the floor speakers L include right floor speakers LR and left floor speakers LL. This allows the floor speakers L to reproduce sounds in stereo.

Each of the one or more floor speakers L includes one or more speaker units L1 (a right floor speaker L1R and a left floor speaker L1L in FIG. 2) and speaker enclosures L2 (a right speaker enclosure L2R and a left speaker enclosure L2L in FIG. 2, for example). The speaker unit L1 is able to convert an electric signal to a sound and output the sound, and the speaker enclosure L2 is able to support the speaker unit L1.

[Speaker Unit L1]

The speaker unit L1 is not specifically limited as far as the speaker unit L1 is a speaker unit capable of converting an electric signal into a sound and outputting the sound from a front face and a back face. Since the floor speaker L includes the speaker unit L1, the floor speaker L is able to convert an electric signal provided from an amplifier or the like to a sound and output the sound. In addition, this allows the floor speaker L to amplify the sound outputted from the back face via the building foundation structure U and output the sound.

It is preferable that the number of the speaker units L1 be one. As such, the speaker unit L is closer to a point sound source than a case in which a plurality of the speaker units L1 is included, making it possible to output a sound having a sound position, which is a position of a sound, reproduced more faithfully. It is preferable that the speaker unit L1 have a full-range speaker that does not use a filter circuit (also referred to as a "filter", a "wave filter", or a "network") such as a high-pass filter (also referred to as a "high-pass wave filter") and a low-pass filer (also referred to as a "low-pass wave filter"). The speaker unit L1 including the full-range speaker is able to output sounds without using a network that may delay a phase of an electric signal. This allows the speaker unit L1 including the full-range speaker to output with high efficiency a sound that responds quickly to a minute signal. Therefore, the speaker unit L1 including the full-range speaker is able to output the sound that is more faithful to an original sound contained in an electric signal and clearly represents a minute sound. The speaker system S of the present embodiment is able to output a rich low-pitched sound through amplification via the building foundation structure U, to be described below, even if the speaker unit L1 is the full-range speaker that does not easily output low-pitched tones. In a case where the speaker unit L1 includes the full-range speaker, the speaker unit L1 preferably has a configuration that combines a strong magnetic circuit and a light diaphragm. This allows the speaker unit L1 to output with higher efficiency the sound that responds more quickly to the minute signal. In a case where the speaker unit L1 includes the full-range speaker, the speaker unit L1 may also include a super tweeter capable of outputting ultra-high-pitched sounds with a little distortion. This allows the speaker unit L1 to output sufficiently ultra-high-pitched sounds even when the speaker unit L1 includes the full-range speaker that does not easily output the ultra-high-pitched sound. Preferably, the super tweeter is able to output sounds without using the network. This makes it possible to prevent a delay of a phase of the sound outputted from the super tweeter and a slow response to the minute signal.

[Speaker Enclosure L2]

The speaker enclosure L2 (the right speaker enclosure L2R and the left speaker enclosure L2L in FIG. 2, for example) is able to accommodate at least one or more of the one or more speaker units L1, and includes a speaker top part L21 (a right speaker top part L21R and a left speaker top part L21L of FIG. 2, for example) and a speaker throat part L22 (a right speaker throat part L22R and a left speaker throat part L22L of FIG. 2, for example). The speaker top part L21 has an internal space that allows for passage of at least part of sounds outputted from the back face of the speaker unit L1. The speaker throat part L22 is configured to be able to couple the internal space of the speaker top part L21 to a space inside the building foundation structure U. Since the floor speaker L includes the speaker enclosure L2, it is possible to guide the sound outputted from the back face of the speaker unit L1 to the space inside the building foundation structure U.

In a case where the speaker unit L1 includes the full-range speaker, it is preferable that the speaker enclosure L2 be able to guide the sound outputted from the back face of the full-range speaker to the space inside the building foundation structure U. This is able to further reduce distortion of the low-pitched sounds outputted via the building foundation structure U. In addition, it is also possible to output the low-pitched sounds outputted via the building foundation structure U by means of the full-range speaker that quickly responds to the minute signal and is highly efficient.

[Speaker Top Part L21]

The speaker top part L21 has the internal space that allows for the passage of the at least part of the sounds outputted from the back face of the speaker unit L1 to an internal space of the speaker throat part L22.

It is preferable that the internal space of the speaker top part L21 be an internal space not connected to outside of the floor speaker L excluding the space inside the building foundation structure. This may prevent the sounds outputted from the back face of the speaker unit L1 from leaking to the outside of the floor speaker L. Therefore, it is possible to guide more sounds to the building foundation structure U.

[Speaker Throat Part L22]

The speaker throat part L22 has the internal space that allows for the passage of the at least part of the sounds outputted from the back face of the speaker unit L1 from the internal space of the speaker top part L21 toward the space inside the building foundation structure U.

It is preferable that the internal space of the speaker throat part L22 be configured in a reverse taper shape having a cross section area widening from the internal space of the speaker top part L21 toward the space inside the building foundation structure U. This gradually depressurizes sounds outputted by the speaker unit L1 in the internal space of the speaker throat part L22, increasing displacement of sound waves, and amplifies the sounds. This makes it possible to guide the amplified sounds having even greater displacement to the building foundation structure U.

It is preferable that the internal space of the speaker top part L21 be an internal space not connected to the outside of the floor speaker L excluding the building foundation structure U. This makes it possible to prevent the sounds outputted from the back face of the speaker unit L1 leaking to the outside of the floor speaker L. Therefore, it is possible to guide more sounds to the building foundation structure U. Moreover, it is possible to prevent the sounds, which are outputted from the back face of the speaker unit L1 and have a different phase from sounds outputted from the front face of the speaker unit L1, from interfering with the sounds outputted from the front face of the speaker unit L1, at a position close to the speaker unit L1 outside of the floor speaker L.

[Other Speakers]

There may be three or more floor speakers L. As such, in addition to the right floor speaker LR and the left floor speaker LL that are able to output sounds in stereo, one or more separate speakers may be placed at locations in respective directions such as a front direction, a back direction, an upper direction, or the like. This allows the floor speaker L to output a sound having a sound position that corresponds to a location where the separate speaker is placed. Other speakers may or may not be connected with the building foundation structure U. Connected with the building foundation structure U, the other speakers may realize a wide variety of advantages of the back-loaded horn type. Not connected with the building foundation structure U, the other speakers may be placed at a location independent of the building foundation structure U.

<Underfloor Foundation B>

The underfloor foundation B is not specifically limited as far as the underfloor foundation B has an approximately planar structure provided under a floor of a building such as a residential house. The underfloor foundation B may be a building foundation, for example. In a case where the speaker system S is provided in a two- or more-story building inclusive of a ground floor and/or a basement floor, the underfloor foundation B may be an approximately planar structure that horizontally divides between a floor where the speaker system S is provided and a floor immediately below the floor. The approximately planar structure is exemplified by a ceiling or the like provided on the floor immediately below the floor where the speaker system S is provided.

Since the underfloor foundation B is the foundation of the building, it is possible to provide the building foundation structure U so that the building foundation structure U doubles as the foundation structure of the building. As a result, it is possible to realize the sound field with a sense of reality immediately above the foundation structure of the building (a section on the first floor area of a building with no basement floor, for example). Therefore, it is possible for the speaker system S to realize the sound field with a sense of reality in an audio-room provided on the first floor of the residential house, for example.

Since the underfloor foundation B has the approximately planar structure that horizontally divides between the floor where the speaker system S is provided and the floor immediately below, it is possible to provide the building foundation structure U on a floor that is not immediately above the building foundation structure (a section on the second or higher floor of a building, a section on the first or higher floor of a building with the basement floor, or the like, for example). This allows the speaker system S to realize the sound field with a sense of reality on the floor that is not immediately above the building foundation structure. Therefore, the speaker system S is able to realize the sound field with a sense of reality in a movie theater and a theater or the like that is provided on the second or higher floor of the building, for example.

<Building Foundation Structure U>

Figure 4:
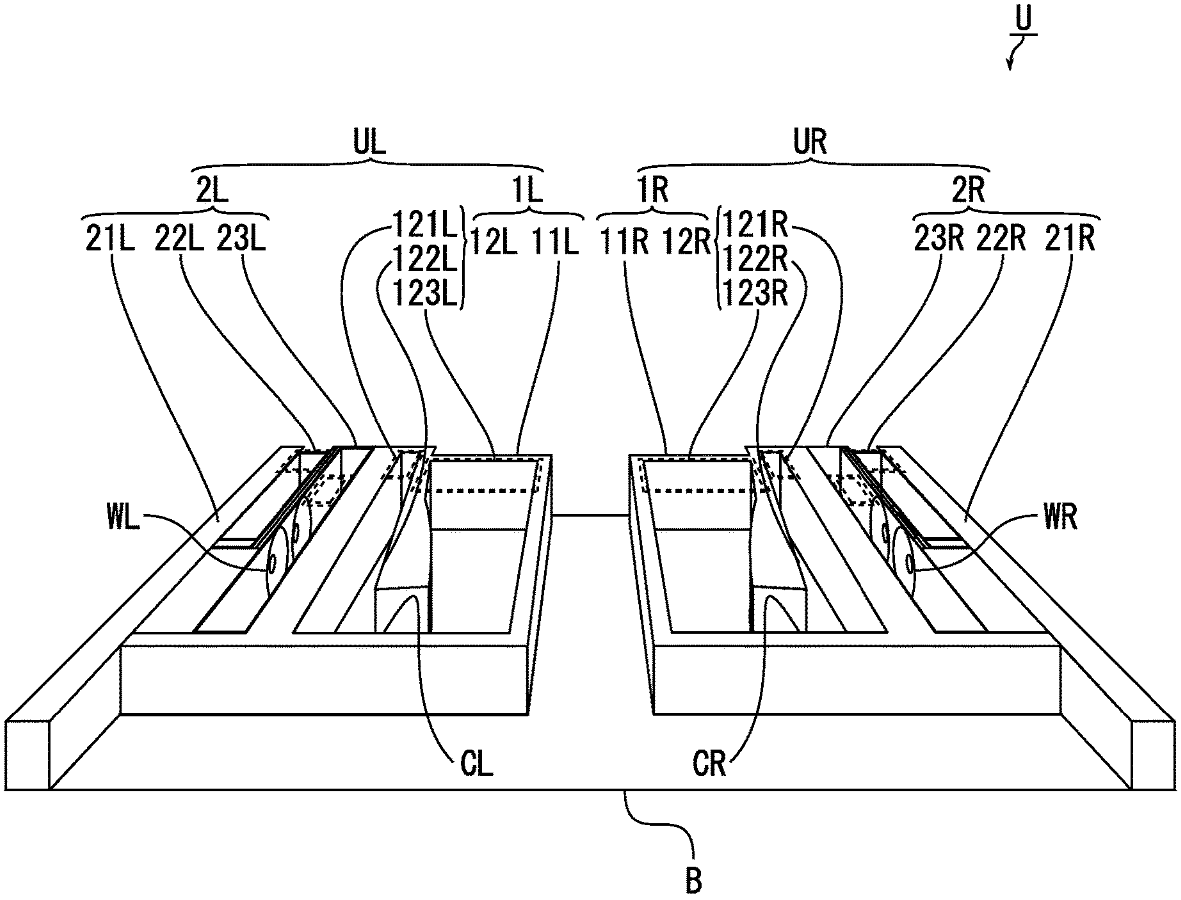
FIG. 4 is a schematic view illustrating a building foundation structure U of the present embodiment when viewed from diagonally above.
Figure 5:
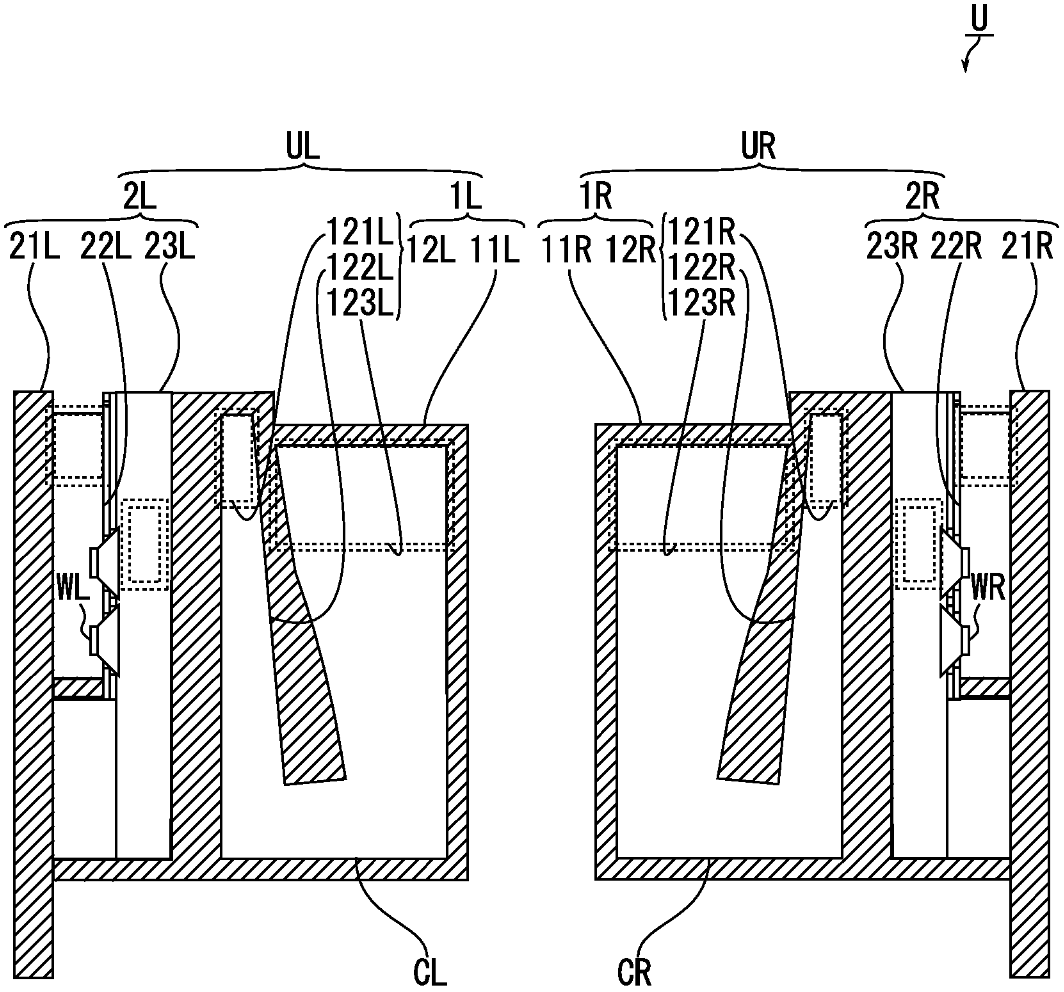
FIG. 5 is a top view illustrating an outline of the building foundation structure U of the present embodiment.

FIG. 4 is a schematic view illustrating the building foundation structure U of the present embodiment when viewed from diagonally above. FIG. 5 is a top view illustrating an outline of the building foundation structure U of the present embodiment. The building foundation structure U includes a sound amplification structure 1 (a right sound amplification structure 1R and a left sound amplification structure 1L or the like in FIG. 4, for example) capable of amplifying and outputting sounds from the floor speaker L.

In a case where the floor speakers L include the right floor speaker LR and the left floor speaker LL, it is preferable that the building foundation structures U include a right building foundation structure UR and a left building foundation structure UL, the right building foundation structure UR capable of amplifying and outputting sounds from the right floor speaker LR, and the left building foundation structure UL capable of amplifying and outputting sounds from the left floor speaker LL. This allows the building foundation structure U to amplify the sounds outputted by the floor speakers L in stereo.

In a case where the building foundation structures U include the right building foundation structure UR capable of amplifying and outputting the sounds from the right floor speaker LR and the left building foundation structure UL capable of amplifying and outputting the sounds from the left floor speaker LL, it is preferable that a shape of the right building foundation structure UR in planar view be approximately symmetrical with that of the left building foundation structure UL. This makes it possible to prevent distortion of right and left sounds when the sounds are reproduced in stereo.

It is preferable that the building foundation structures U further include an underfloor subwoofer installation part 2 (a right underfloor subwoofer installation part 2R and a left underfloor subwoofer installation part 2L of FIG. 4, for example) where installation of subwoofers W (a right subwoofer WR and a left subwoofer WL of FIG. 4, for example) is possible. This allows the underfloor subwoofer installation parts 2 to amplify low-pitched sounds outputted by the subwoofers W. In a case where the floor speakers L include the right floor speaker LR and the left floor speaker LL, it is preferable that the building foundation structures U include the right underfloor subwoofer installation part 2R and the left underfloor subwoofer installation part 2L. This allows the speaker system S to output in stereo the low-pitched sounds as well as the mid- and high-pitched sounds.

[Sound Amplification Structure 1]

The sound amplification structure 1 (also referred to as a "building foundation built-in sound amplification structure") includes a sound path 12, the sound path 12 being formed by the building underfloor foundation B and concrete peripheral walls 11 (a right concrete peripheral wall 11R and a left concrete peripheral wall 11L of FIG. 4, for example). The concrete peripheral walls 11 are formed by standing up approximately vertically from the underfloor foundation B.

Known speaker types include a sealed type, a bass-reflex type, a front-loaded type, and a back-loaded horn type. It is known that the back-loaded horn type is able to generate a sound at higher efficiency than the sealed-type, the bass-reflex type, and the front-loaded type. As such, the back-loaded horn type is able to reproduce a realistic sound field with a sharp rise in the entire effective range as well as in a low tone range. Thus, the back-loaded horn type is better from the viewpoint of reproduction of the sound field with a sense of reality. However, the back-loaded horn type has a problem that a tubular structure with a total length of a few meters has to be provided behind a speaker unit, thus making an enclosure (also referred to as a "housing" or a "cabinet") huge. Therefore, at present, the back-loaded horn speakers are not mass-produced in Japan.

In the sound amplification structure 1 of the embodiment, the sound path 12 which corresponds to the tubular structure is provided in the building underfloor foundation B. Thus, is it not necessary to provide a heavyweight tubular structure in the speaker enclosure L2 of the floor speaker L placed on the floor in a room of a building. As a result, it is possible to make the size of the speaker enclosure L2 to accommodate the speaker unit L1 comparable with that of the other types such as the sealed type, the bass-reflex type, and the front-loaded type.

In a case where the building foundation structures U include the right building foundation structure UR capable of amplifying and outputting the sounds from the right floor speaker LR and the left building foundation structure UL capable of amplifying and outputting the sounds from the left floor speaker LL, it is preferable that a shape of the right sound amplification structure 1R in planar view be approximately symmetrical with that of the left sound amplification structure 1L. This makes it possible to prevent distortion of right and left sounds when the sounds are reproduced in stereo.

[Concrete Peripheral Walls 11]

The concrete peripheral walls 11 form the sound path 12 by the building underfloor foundation B, and the concrete peripheral walls 11 that are formed by standing up approximately vertically from the underfloor foundation B. A kind of concrete used in the concrete peripheral walls 11 is not specifically limited.

It is preferable that the concrete peripheral walls 11 double as the building foundation structure. This makes it possible to provide the concrete peripheral walls 11 for which the building foundation structure exemplified by the cloth foundation and the mat foundation is diverted. Therefore, it is possible to construct and easily install the sound amplification structure 1 built into a building foundation when the building is newly constructed or remodeled.

[Sound Path 12]

The sound path 12 is formed by the underfloor foundation B of the building and the concrete peripheral walls 11 that are formed by standing up approximately vertically from the underfloor foundation B. The sound path 12 is able to communicate with the floor speakers L placed in the room of the building at the speaker unit communication sections 121 (a right speaker unit communication section 121R and a left speaker unit communication section 121L of FIG. 4, for example) which are one end of the sound path 12. The sound path 12 is able to output sounds that are emitted from the floor speakers L and amplified through amplification units 122 (a right amplification unit 122R and a left amplification unit 122L of FIG. 4, for example) of the sound path 12 at output units 123 (a right increased output unit 123R and a left output unit 123L) provided at the other end of the sound path 12.

In general, the enclosure is made of wood, irrespective of which of the sealed type, the bass-reflex type, the front-loaded type or the back-loaded horn type the enclosure is. Wood is vulnerable to vibrations in the low tone range, however, and causes sound distortion in the low tone range of 20 Hz to 600 Hz. As a consequence, there is a limitation on reproduction of the atmosphere of live performance. It is difficult to output low-pitched sound waves below 30 Hz, in particular, and offer an experience in which one sufficiently feels the atmosphere of live music, including not only human sensitivity and hearing but also tremors caused by sound waves to the whole body.

In the sound amplification structure 1 of the embodiment, because the sound path 12 is formed by the peripheral walls 11 of concrete having the tough physical properties, there is no distortion due to the sound waves in the low tone range.

A width of the sound path 12 widens from one end on side of the speaker unit communication section 121 toward one end on side of the output unit 123. The upper limit of a ratio obtained by dividing the width of the sound path 12 at the one end on the side of the output unit 123 by the width of the sound path 12 at the one end of the speaker unit communication section 121 is preferably 4 or smaller, more preferably 3 or smaller, and further more preferably 2.5 or smaller. This may prevent sounds from going straight away from the concrete peripheral walls 11, in the rapidly widening sound path 12.

The lower limit of the above-described ratio is preferably 1.3 or larger, more preferably 1.5 or larger, and further more preferably 2 or larger. This further depressurizes the sounds outputted from the speaker units L1 in the sound path 12. As a result, the displacement of the sound waves further increases and the sounds are further amplified. Thus, the amplified sounds having the further larger displacement may be outputted.

To improve the accuracy of bass reproduction, the sound path is preferably longer. However, if the enclosure is made of wood and the sound path is longer than 3 m, the low-pitched sound reaches the ear later than the mid- and high-pitched sounds, which becomes stressful for the listener. Because the sound path 12 is formed by the building underfloor foundation B and the concrete peripheral walls 11 that are formed by standing up approximately vertically from the underfloor foundation B, there is no delay in arrival of the low-pitched sound even when the length of the sound path 12 is long. Hence, the listener is able to listen to the sound without stress.

It is preferable that the lower limit of the length of the sound path 12 be 4 m or longer. This may further improve the accuracy of bass reproduction. The upper limit of the length of the sound path 12 is preferably 15 m or shorter, more preferably 8 m or shorter, and further more preferably 5 m or shorter. This may further prevent occurrence of the delay in arrival of the sounds amplified in the sound path 12.

(Speaker Unit Communication Sections 121)

The speaker unit communication section 121 is configured to be connectable with the speaker throat part L22. The speaker unit communication section 121 is not specifically limited as far as the speaker throat part L22 and the sound amplification structure 1 are able to communicate with each other.

It is preferable that the speaker unit communication section 121 have an approximately same cross-sectional shape as that of the speaker throat part L22 at a section where the speaker unit communication section 121 is in contact with the speaker throat part L22. This may allow sounds to flow from the speaker throat part L22 toward the speaker unit communication section 121 without a hitch.

(Amplification Units 122)

The amplification units 122 are able to amplify sounds that are provided from the floor speakers L via the speaker unit communication section 121, and correspond to the tubular structure of the floor speakers L.

It is preferable that the amplification units 122 have curved parts C. This may place the output unit 123 in a periphery of the floor speaker L. Because the output units 123 are placed in the periphery of the floor speaker L, it is possible to reduce a difference in sound positions between the sounds outputted from the floor speakers L and those outputted from the output units 123. Since the amplified low-pitched sounds that are outputted from the output units 123 placed in the periphery of the floor speakers L are sounds having a long wavelength, it is possible to output sounds that makes any difference in the sound positions from the floor speakers L unnoticeable.

The number of the curved parts C is not specifically limited. It is preferable that the curved parts C be provided to make the sound path 12 be U-shaped, Z-shaped, or zig-zag shaped. This makes it possible to place the sound path 12 in the limited space of the underfloor foundation B, and to attenuate the mid- and high-pitched sounds, thereby keeping a level difference between the mid- and high-pitched sounds and the low-pitched sound small.

Above all, it is preferable that the curved parts C be provided so as to make the sound path 12 be U-shaped. This may minimize the number of the curved parts C and further prevent attenuation of the low-pitched sound in the curved parts C of the sound path 12.

(Output Units 123)

The output unit 123 is provided at an end of the sound path 12 that is different from the speaker unit communication section 121. In the output unit 123, the sound path 12 stands up and communicates with the floor, and is able to output onto the floor the low-pitched sound that is amplified through the amplification units 122 of the sound path 12.

Preferably, the output units 123 are able to pass the sounds in the periphery of a connecting part with the floor and place an anti-drop member capable of preventing a person or the like from falling. This makes it possible to balance between the prevention of the fall of the person or the like from the output unit 123 and the output of the amplified sounds. The anti-drop member is not specifically limited and may be a grid-like lid, or the like, capable of blocking the output part 123 and the periphery of the connecting part of the output unit 123 with the floor.

[Underfloor Subwoofer Installation Part 2]

The underfloor subwoofer installation part 2 is provided, being surrounded by the underfloor foundation B and second concrete peripheral walls 21. The second concrete peripheral walls 21 (which is also referred to as the "secondary concrete peripheral wall", and are, for example, a second right concrete peripheral wall 21R or a second left peripheral wall 21L of FIG. 4) are formed by standing up approximately vertically from the underfloor foundation B. It is possible to install the subwoofer W in the underfloor subwoofer installation part 2.

Because the underfloor subwoofer installation part 2 is surrounded by the second concrete peripheral walls 21 and of an ASW method that only uses duct resonance of the bass-reflex type, it is possible to clearly reproduce slow, and thick low-pitched sounds.

For example, in the case of a compact disk (CD) that records rock music, the compact disc itself does not record slow and heavy low-pitched sounds, which may be enjoyed in a live concert. In such a case, use of the subwoofer has the effect of producing the slow and heavy low-pitched sound, and makes it possible to recreate the realism of a concert at home, depending on a genre.

Preferably, the underfloor subwoofer installation part 2 includes a subwoofer back amplification unit 22 (a right subwoofer back amplification unit 22R and a left subwoofer back amplification unit 22L of FIG. 4, for example) and a subwoofer front amplification unit 23 (a right subwoofer front amplification unit 23R and a left subwoofer front amplification unit 23L of FIG. 4, for example). The subwoofer back amplification unit 22 is a space provided in the back of the subwoofer W and the subwoofer front amplification unit 23 is a space provided in front of the subwoofer W. This allows the subwoofer W to be configured as an ASW (Acoustic Sub Woofer) that only uses the duct resonance of the bass-reflex type where both a front and a back of a speaker unit are sealed. Consequently, because the front and back of the subwoofer are both sealed in a case where the subwoofer W is installed in the underfloor subwoofer installation part 2, the high range sounds not capable of passing through the enclosure are cut off and only the low-pitched sounds may be reproduced.

In a case where the building foundation structures U include the right underfloor subwoofer installation part 2R and the left underfloor subwoofer installation part 2L, it is preferable that a shape of the right underfloor subwoofer installation part 2R in planar view be approximately symmetrical with that of the left underfloor subwoofer installation part 2L. This may prevent any distortion of the right and left sounds when the low-pitched sounds are played in stereo.

As described above, according to the building foundation structures U of the embodiment, the sound amplification structure 1 and the underfloor subwoofer installation part 2, which are surrounded by the concrete peripheral walls 11 or the like, each amplify sounds. This allows the building foundation structures U of the embodiment to realize the sound field with a sense of reality in the residential house, without increasing the size of the speaker.

The building foundation structures U of the embodiment are provided with the sound amplification structure 1. This sound amplification structure 1 includes the sound path 12 that is formed by the building underfloor foundation B and the concrete peripheral walls 11 formed by standing up approximately vertically from the underfloor foundation B. Hence, it is possible to install a large-size speaker which is acoustically advantageous, without sacrificing any underfloor space.

A speaker device structured to be placed on the floor or the like is limited in a size and weight, due to strength of the floor or the like. The speaker system S of the present embodiment may eliminate the limitations in terms of the size and the weight, by having a built-in back-loaded horn unit as the sound amplification structure 1. This realizes a concrete-made and large-size sound amplification structure 1, thus making it possible to dramatically improve acoustic performance without any distortion that makes sounds dirty, in the bass reproduction, in particular.

In the speaker system S of the embodiment, since the underfloor foundation B is the building foundation, the building foundation structure U is provided so that the underfloor foundation B doubles as the building foundation structure. This allows the speaker system S to be constructed simultaneously when foundation construction such as house building or floor remodeling work or the like is performed. This may add a new option of providing the building foundation structure U to the house building and/or floor remodeling work or the like.

The speaker system S of the present embodiment is able to not only improve the acoustic performance in the bass reproduction, in particular, but also to provide a residential house with a feature to effectively utilize a so-called a space under the floor and be capable of playing music with the excellent sound quality, in the context of the housing conditions of Japan which has a small land area.

Incidentally, the experience of listening to air vibrations by the ear differs from that of feeling vibrations through floor tremor or the like, in addition to the air vibrations. For example, a sense of fear and vividness of when one listens to vibrations of an earthquake as sounds through headphones may differ from a sense of fear and vividness of when one feels vibrations of an earthquake including tremors at earthquake experience facilities or the like.

The speaker system S of the present embodiment amplifies sounds using the building foundation structures U. Thus, not only the sounds generated by the speaker units L1 vibrating the air but also the sound waves, trembling, and/or shaking of the sounds by the building foundation structures U may be transmitted to the whole body of a person. Therefore, the speaker system S may impress a person with vivid sounds not only through the auditory sense which the human ear is equipped but also through other senses which the whole human body is equipped.

Because the speaker system S of the present embodiment amplifies sounds by using the building foundation structures U, it is possible to provide the speaker system S which is larger than a speaker that uses the wooden enclosure. Moreover, because the building foundation structure U includes the concrete peripheral walls 11 or the like, it is possible to realize the sound amplification structure 1 with heavy weight, which is difficult to place on the floor, and to solve the problem of the wooden enclosure of being vulnerable to low frequency tremors.

Since the sound amplification structure 1 realizes the back-loaded horn speaker system S, when compared with the sealed type or bass-reflex type, the speaker system S of the present embodiment is able to achieve better responsiveness (which is also referred to as "transient") that makes it possible to follow a momentary change in signals, and rising and falling of sounds with a shorter delay. The ability to achieve the excellent transients allows for realization of the speaker system S that is more excellent as pure audio that converts into sounds and outputs information recorded in such media as a CD, a record, a tape, or the like as faithfully as possible.

Because the speaker system S of the present embodiment is of the back-loaded horn type, the back of the speaker unit L1 is not blocked. As a result, the speaker system S may output more minute signals as sounds than the sealed type and the bass-reflex type do. Thus, the speaker system S may realize a larger dynamic range than the sealed type and the bass-reflex type.

Because the underfloor subwoofer installation part 2 of the present embodiment is able to configure the subwoofer W as a bass-reflex type ASW surrounded by the second concrete peripheral wall 21, the slow and thick low tone range is clearly reproduced with low distortion. As a result, with a combined use of low-pitched sounds amplified at the sound amplification structure 1 and low-pitched sounds outputted by the underfloor subwoofer installation part 2, it is possible to realize the excellent bass reproduction that takes advantage of toughness, large mass, and heavy weight of concrete. In a sound source such as rock music where the thick low tone range is preferred, the speaker system S is able to compensate for low-pitched sounds not recorded in the media such as the CD and to output the sound source with powerful sounds.

In addition, it is to be understood that within the idea of the present invention, those skilled in the art could arrive at various examples of changes and modifications and that those examples of changes and modifications also belong to the scope of the present invention. For example, any additions to, deletions from, or design changes made by those skilled in the art to the above-described embodiments or any additions to, deletions from, or condition changes to a process made by those skilled in the art shall also be included in the scope of the present invention as long as they have the gist of the present invention.

EXAMPLES

In the following, the present invention will be specifically described with reference to Examples. However, the present invention shall not be limited thereto.

<Construction of Speaker System>

The speaker system S of the embodiment was constructed. Furthermore, a 2.1 ch speaker system that used a commercially available sealed type speaker and bass-reflex type speaker was also constructed as a target for comparison.

[Example] Speaker System S of the Embodiment

In accordance with the embodiment, a speaker system S was constructed, including a right floor speaker LR, a left floor speaker LL, a right subwoofer WR, a left subwoofer WL, a right building foundation structure UR, and a left building foundation structure UL.

[Construction of Building Foundation Structures U]

Forms were installed that were each capable of forming a right concrete peripheral wall 11R, a left concrete peripheral wall 11L, a right second concrete peripheral wall 21R, and a left second concrete peripheral wall 21L, respectively, which stood up approximately vertically from an underfloor foundation B with a width of 35 m and a depth of 16.5 m. Then, ready mix concrete was injected into the forms, and cured after compaction and finishing were performed to form the right concrete peripheral wall 11R, the left concrete peripheral wall 11L, the right second concrete peripheral wall 21R, and the left second concrete peripheral wall 21L, respectively.

Each of the right concrete peripheral wall 11R and the left concrete peripheral wall 11L was formed approximately symmetrically, so that sound amplification structures 1 (a right sound amplification structure 1R and a left sound amplification structure 1L), which were formed by the underfloor foundation B and the concrete peripheral walls 11, include a speaker unit communication section 121 with a width of 0.1 m and a depth of 0.29 m; a 4.5 m long, U-shaped sound path 12 connecting the speaker unit communication section 121 and an output unit 123; and the output units 123 with a width of 0.574 m and a depth of 0.33 m.

At a height of the floor, the center of the output unit 123 was 0.47 m away from that of the speaker unit communication section 121. The center of the speaker unit L1 was 1 m away from that of the output unit 123.

Each of the right second concrete peripheral wall 21R and the left second concrete peripheral wall 21L was formed approximately symmetrically, so that underfloor subwoofer installation parts 2 (a right underfloor subwoofer installation part 2R and a left underfloor subwoofer installation part 2L) included a subwoofer back amplification unit 22 with a width of 0.17 m and a depth of 8.95 m, and a subwoofer front amplification unit 23 with a width of 0.188 m and a depth of 15.75.

Consequently, a right building foundation structure UR and a left building foundation structure UL, which were approximately symmetrical, were constructed.

[Installation of Subwoofers W]

For each of the right underfloor subwoofer installation part 2R and the left underfloor subwoofer installation part 2L, two each of commercially available subwoofers W with a diameter of 0.23 m were placed between the subwoofer back amplification unit 22 and the subwoofer front amplification unit 23.

[Construction of Room]

A room where the speaker system S was housed was constructed by laying floors on the right building foundation structure UR and the left building foundation structure UL and forming walls.

[Installation of Floor Speakers L]

A commercially available speaker unit L1 (manufactured by Fostex Inc., "FE208NS") with a diameter of 0.23 m, an input wattage of 40 W, and a sound pressure level of 94 dB was housed in a speaker enclosure L2, having an approximately cuboid speaker top part L21 and an approximately quadrangular pyramid shaped speaker throat part L22, to construct the right floor speaker LR and the left floor speaker LL.

The speaker top part L21 is approximately cuboid, with an outer dimension of 0.268 m in width, 0.390 m in depth, and 0.268 m in height, and an inner dimension of 0.226 m in width, 0.260 m in depth, and 0.226 m in height.

The speaker throat part L22 is approximately quadrangular pyramid, with the outer dimension of 0.142 m in width, 0.207 m in upper depth, 0.332 m in lower depth, and 0.97 m in height, and the inner dimension of 0.10 m in width, 0.165 m in upper depth, 0.290 m in lower depth, and 0.97 m in height.

Each of the constructed right floor speaker LR and left floor speaker LL was installed, so that the speaker throat part L22 was connected to each of a right speaker unit communication section 121R and a left speaker unit communication section 121L.

[Connection of Amplifier]

A commercially available amplifier was connected to each of the right floor speaker LR, the left floor speaker LL, the right subwoofer WR, and the left subwoofer WL, so that these devices may output sounds with 2.1 ch surround.

As a result, the speaker system S of the embodiment (hereinafter simply referred to as an "Example") was constructed.

[Comparative Example 1] 2.1 ch Speaker System Using Commercially Available Bass Reflex Type Speaker A 2.1 ch bass-reflex type speaker system (hereinafter simply referred to as "Comparative Example 1") that was a target for comparison was constructed, by connecting a same amplifier as the Example to the 2.1 ch speaker system that was constructed by using two commercially available bass-reflex type speakers and the subwoofer.

[Comparative Example 2] 2.1 ch Speaker System Using Commercially Available Sealed Type Speaker A 2.1 ch sealed type speaker system (hereinafter also simply referred to as "Comparative Example 2") that was a target for comparison was constructed, by connecting the same amplifier as the Example to the 2.1 ch speaker system that was constructed by using two commercially available sealed type speakers and the subwoofer.

<Evaluation>

[Sensory Assessment]

As for a commercially available compact disk (GLOBAL CULTURE AGENCY INC., Standard Product Number "SACG-30008" entitled "ONDEKOZA Fugaku Hyakkei (A Hundred views of Mt. Fuji)/FUJIYAMA) that recorded the performance of Japanese drums, sounds obtained by reproducing the track No. 5 "Mikuni" were outputted from the Example, the Comparative Example 1, and the Comparative Example 2. Then, a sensory evaluation was conducted, in which a monitor listened to the sounds outputted from the Example, the Comparative Example 1, and the Comparative Example 2, respectively.

The monitor who listened to the sounds outputted from the Example evaluated that vibrations were transmitted from the back of the monitor and from the floor, which gave a sense of reality comparable with a movie theater equipped with a 7.1 ch speaker system. As for low-pitched sounds, the monitor evaluated that the delay in bass arrival and the bass distortion were not felt, and that the sounds were bass which rose sharply, had a sense of speed, and fitted well. As for the sound position, the monitor evaluated that the sounds showed the position of each of the Japanese drums.

The monitor who listened to the sounds outputted from the Comparative Example 1 evaluated that even though the sounds were transmitted from the front of the monitor, they were far from realistic. As for the low-pitched sounds, the monitor evaluated that although no delay in bass arrival was felt, as compared to the Example, the sounds were bass that rose slowly, lacked in a sense of speed, and fitted poorly. As for the sound position, the monitor evaluated that the sounds showed the position of each of the Japanese drums.

The monitor who listened to the sounds outputted from the Comparative Example 2 evaluated that even though the sounds were transmitted from the front of the monitor, they were far from realistic. As for the low-pitched sounds, the monitor evaluated that although no delay in bass arrival was felt, as compared to the Example, the sounds were bass that rose slowly, lacked in a sense of speed, and fitted poorly. As for the sound position, the monitor evaluated that the sounds showed the position of each of the Japanese drums.

[Discussion]

In the Example, the sounds of the speaker unit L1 were amplified by the sound amplification structure 1, and, furthermore, the sounds from the subwoofer were amplified in the underfloor subwoofer installation part 2. Consequently, although, similarly to the Comparative 1 and the Comparative 2, the Example was the 2.1 ch speaker system that outputted sounds from the two speaker units and subwoofer, it is believed that unlike the Comparative Example 1 and the Comparative Example 2, the Example was able to provide the sense of reality which was comparable with the movie theater equipped with the 7.1 ch speaker system, the 7.1 ch speaker system outputting sounds from the seven speaker units and the subwoofer that were installed so as to surround a listener.

In the Example, because the sound amplification structure 1 was formed by the concrete peripheral wall 11, sounds rose sharply. Thus, although sounds were amplified by the sound amplification structure 1 with a total length of 4.5 m, it is believed that sounds showing no delay in bass arrival were outputted.

In the Example, the sound amplification structure 1 was formed by the concrete peripheral wall 11, and furthermore the underfloor subwoofer installation part 2 was formed by the second concrete peripheral wall 21. Thus, it is believed that sounds showing no distortion of bass were outputted.

In the Example, the back-loaded horn speaker unit was used. As a result, it is believed that unlike the Comparative Example 1 in which the bass-reflex type speaker unit was used and the Comparative Example 2 in which the sealed type speaker unit was used, the low-pitched sounds that rose sharply, had the sense of speed, and fitted well were outputted. More specifically, it is believed that the Example was able to achieve the better responsiveness that made it possible to follow a momentary change in signals, and rising and falling of sounds with a shorter delay than the speaker system that used the bass-reflex type and sealed type speaker units.

In the Example, the sound path 12 was formed in a U-shape. As a result, although the sound path 12, which was the back-loaded horn part, had the total length of 4.5 m, the distance between the center of the speaker unit L1 and that of the output unit 123 was kept to 1 m only. Hence, it is believed that similarly to the Comparative Example 1 and the Comparative Example 2 that had no back-loaded horn part, the sounds showing the position of each of the Japanese drums were outputted.

DESCRIPTION OF THE REFERENCE NUMERALS

S Speaker system
L Speaker
LR Right speaker
L1R Right speaker unit
L2R Right speaker enclosure
L21R Right speaker top part
L22R Right speaker throat part
LL Left speaker
L1L Left speaker unit
L2L Left speaker enclosure
L21L Left speaker top part
L22L Left speaker throat part
WR Right subwoofer
WL Left subwoofer
B Underfloor foundation
U Building foundation structure
1 Sound amplification structure
2 Underfloor subwoofer installation part
UR Right building foundation structure
1R Right sound amplification structure
11R Right concrete peripheral wall
12R Right sound path
121R Right speaker unit communication section
122R Right amplification unit
123R Right output unit
2R Right underfloor subwoofer installation part
21R Right secondary concrete peripheral wall
22R Right subwoofer back amplification unit

23R Right subwoofer front amplification unit
UL Left building foundation structure
1L Left sound amplification structure
11L Left concrete peripheral wall
12L Left sound path
121L Left speaker unit communication section
122L Left amplification unit
123L Left output unit
2L Left underfloor subwoofer installation part
21L Left secondary concrete peripheral wall
22L Left subwoofer back amplification unit
23L Left subwoofer front amplification unit
CR Right curved part
CL Left curved part

The invention claimed is:

1. A speaker system comprising full-range speakers placed in a room of a building and capable of stereo sound reproduction without using a filter circuit, and a building foundation structure, wherein:

the full-range speakers each including a single speaker unit, the building foundation structure comprises, sequentially from one lateral side to an opposite lateral side, a first underfloor subwoofer, a first sound amplification structure connected to a first of the full-range speakers, a second sound amplification structure connected to a second of the full-range speakers, and a second underfloor subwoofer, for each of the first sound amplification structure and the second sound amplification structure, a sound path having a first end and a second end is formed by an underfloor foundation of the building and a concrete peripheral wall formed by standing up approximately vertically from the underfloor foundation, the first end of the sound path is able to communicate with the single speaker unit to be placed in the room of the building, a width of the sound path widens from the first end to the second end of the sound path, the ratio of the width of the sound path at the second end to the width of the sound path at the first end is between 2 and 4, the second end of the sound path is able to output a sound that is emitted from the single speaker unit and amplified through the sound path, a length of the sound path is 4 m or longer, the first underfloor subwoofer and the second underfloor subwoofer are configured as bass-reflex types, wherein a subwoofer-side speaker unit is positioned within an area enclosed by the underfloor foundation and a second concrete surrounding wall that rises substantially vertically from the underfloor foundation, with both the front and rear sealed, and the first underfloor subwoofer and the second underfloor subwoofer are arranged relative to one another in a manner that is approximately symmetrically left and right in planar view.

2. The speaker system according to claim 1, wherein the sound path is U-shaped, Z-shaped, or a zig-zag shaped.

3. The speaker system according to claim 1, wherein the concrete peripheral wall also serves as the building foundation structure.

* * * * *